United States Patent [19]

Dalziel

[11] 4,347,535
[45] Aug. 31, 1982

[54] READ/WRITE HEAD CARRIAGE ASSEMBLY

[75] Inventor: Warren L. Dalziel, Monte Sereno, Calif.

[73] Assignee: Shugart Associates, Sunnyvale, Calif.

[21] Appl. No.: 861,909

[22] Filed: Dec. 19, 1977

[51] Int. Cl.³ .............................................. G11B 5/016
[52] U.S. Cl. ........................................ 360/99; 360/104
[58] Field of Search .................. 360/99, 98, 105, 109, 360/103–104

[56] References Cited

U.S. PATENT DOCUMENTS

| | | | |
|---|---|---|---|
| 2,913,536 | 11/1959 | Fuller et al. | 360/109 |
| 2,961,494 | 11/1960 | Darou, Jr. et al. | 360/104 |
| 3,579,213 | 5/1971 | Applequist | 360/103 |
| 3,713,121 | 1/1973 | Fasano et al. | 360/103 |
| 3,733,592 | 5/1973 | Applequist et al. | 360/103 X |
| 3,914,791 | 10/1975 | Stebe | 360/105 X |
| 4,017,898 | 4/1977 | Toombs et al. | 360/105 |
| 4,052,743 | 10/1977 | Stratton | 360/99 |

OTHER PUBLICATIONS

IBM Technical Disclosure Bulletin, vol. 4, No. 3, Aug. 1961, pp. 13–14, "Rotating Recording Head", by Cronquist.

Primary Examiner—John H. Wolff

[57] ABSTRACT

An improved read/write head carriage assembly for use with a floppy disk recorder including a rigidly mounted head-carrying arm, a pivotally mounted head-carrying arm, a damper assembly for limiting the excursion and damping the motion of the pivotally mounted arm, and a pair of protective sleds, each affixed to an arm.

1 Claim, 3 Drawing Figures

U.S. Patent    Aug. 31, 1982    4,347,535
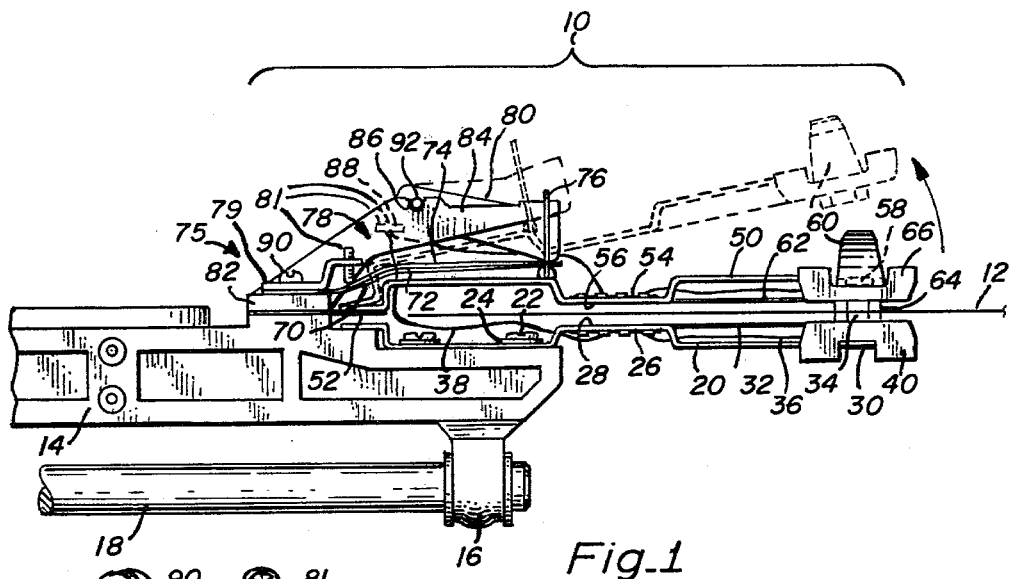
Fig_1
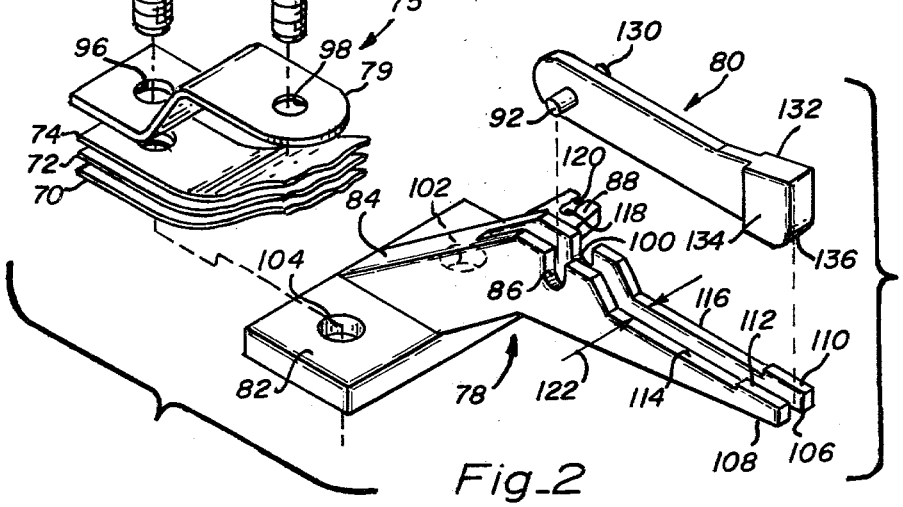
Fig_2
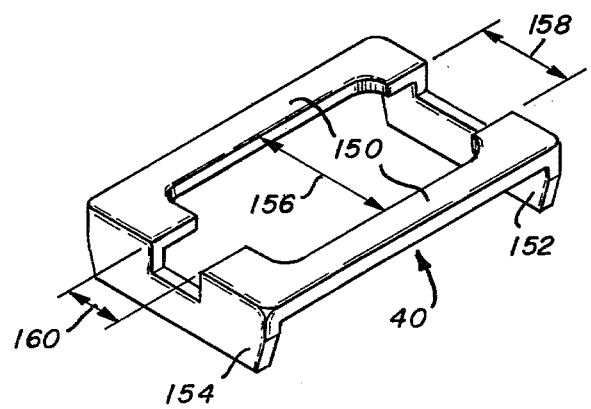
Fig_3

READ/WRITE HEAD CARRIAGE ASSEMBLY

BACKGROUND OF THE INVENTION

1. Field of the Invention

The present invention relates generally to flexible or floppy disk recorders and more particularly to an improved floppy disk read/write head carriage assembly therefor.

2. Description of the Prior Art

In a particular data recorder of the flexible or floppy disk variety, a pair of magnetic read/write heads are disposed over magnetic tracks on opposite sides of a disk and a solenoid is operative to selectively maintain one of the heads in a spaced-apart relationship with respect to the disk. When data is to be recorded on or retrieved from the magnetic surface of the disk, a plurality of springs are permitted to load this head against the disk and thus the disk against the other head.

Since the time required for a disk recorder to record or retrieve data is of primary concern, the period of time between initiation of a load command and when the heads are loaded in compliance with the disk is of considerable moment. It has been observed that a period of approximately 60 to 80 milliseconds elapses from the time the load command signal is initiated and when a valid read signal is obtained from one of the disk recorder heads. This delay has been traced, at least in part, to an oscillatory motion of the first head which, following initial contact with the disk, bounces for several cycles.

An associated problem is that the head initially impacts the disk with considerable force. This force has been found to cause disk deterioration or destruction.

Observations have also indicated that proper head compliance is occasionally further impeded by a defective condition of the thin vinyl protective disk jacket which encloses each disk. Occasionally, the jacket will bow causing mechanical interference which delays or prevents proper head loading.

SUMMARY OF THE PRESENT INVENTION

It is therefore a principal object of the present invention to provide means for minimizing the read/write head load time.

Another object of the present invention is to provide means for minimizing the force with which the head impacts the disk during head loading.

Still another object of the present invention is to provide means for preventing a bowed disk jacket from impeding proper head loading.

Briefly, the preferred embodiment of a read/write head carriage assembly for use with a floppy disk recorder includes a rigidly mounted arm which is affixed at an end to a head positioning carriage member and which carries proximate the other end a flexure mounted read/write head, a pivotally mounted arm which is flexibly affixed at an end to the carriage member, which is biased by a spring toward the other arm, and which carries proximate the other end another flexure mounted read/write head, and a damper having a bifurcated stop member affixed to the carriage member and disposed within a bail affixed to the pivoting arm for limiting the excursions of the arm and a blade pivotally mounted within the slot bifurcating the stop member and disposed within the bail such that motion of the pivoting arm is coupled to the blade causing friction between the blade and the stop portion to reduce both the velocity and oscillatory motion of the arm. The assembly further comprises a pair of sleds each affixed to the arms for preventing interference with the flexures by a defective disk jacket.

The reduction in disk read/write head loading time achieved with the present invention while minimizing head and disk damage is thus a material advantage of the present invention.

These and other objects and advantages of the present invention will no doubt become apparent to those of ordinary skill in the art after having read the following detailed description of the preferred embodiment illustrated in the several figures of the drawing.

IN THE DRAWING

FIG. 1 is a side elevation of a floppy disk read/write head carriage assembly in accordance with the present invention;

FIG. 2 is an exploded perspective view generally illustrating the stop member and blade of the damper assembly shown in FIG. 1; and FIG. 3 is a perspective view generally illustrating one of the sleds shown in FIG. 1.

DETAILED DESCRIPTION OF THE PREFERRED EMBODIMENT

Referring to FIG. 1 a read/write head carriage assembly 10 for use in a disk recorder is illustrated in loaded compliance with a flexible or floppy disk 12. The assembly is attached to a positioning mechanism, the illustrated portion of which includes a portion of a positioning carriage member 14, hereafter referred to as a carriage slidably attached by a bushing 16 to a portion of a fixed linear guide shaft 18. The carriage is selectively driven such as by a drive motor (not shown) to position the head carriage assembly in a position relative to the disk suitable for accessing data thereon.

The read/write head carriage assembly includes an arm 20 having one end which is attached to the carriage by two bolts 22 threaded therein and a pair of washers including a washer 24. The arm is relatively rigid as is necessary for supporting a head and its associated parts. A midportion of the arm is suitably bent, in an inverted U-shape, to form a depression for mounting a thin printed circuit board 26 therein and for providing a head-mounting reference surface 28 along the top thereof.

Projecting outwardly from opposite sides of the arm 20 at its other or outer end and in the plane thereof, there are first and second semicicular mounting ears 30, only one of which can be seen in this figure.

A thin, spring-type flexure 32 has one end welded to surface 28 and an opposite end attached to a read/write head 34. The flexure is suitable for urging the head toward disk 12 with the desired head loading force. In the preferred embodiment approximately 8 grams of head loading force is used.

Electrical wires 36 emanating from the head are connected to traces on the printed circuit board 26 which are also connected to larger gauge wires 38 more suitable for routing the head signals to the disk recorder electronics.

Snapped over arm 20 and retained thereon by the mounting ears 30 is a sled 40. The sides of the sled project above the mounting arm 20 and flexure 32 to prevent contact therewith by a bowed disk jacket (which for clarity is not shown).

Another relatively rigid head-carrying arm 50 is attached at one end to carriage 14 by a flexible member 52. This arm, which is substantially a mirror image of the first arm, also includes a depression for mounting a printed circuit board 54 therein and for providing a head-mounting reference surface 56 on the bottom thereof.

Opposite sides of the other end of arm 50 have sled-mounting ears including an ear 58 (illustrated in dashed representation) and an ear 60. Ear 60 is considerably longer than the other ears and is dog-legged to act as an engaging arm for coupling the head-actuating solenoid (not shown) to arm 50.

Attached to surface 56 is one end of another spring-type flexure 62 which supports at its other end a second read/write head 64. This flexure biases the second head towards disk 12 with a force similar to that exerted by flexure 32.

A second sled 66, for preventing interference with flexure 12 by a defective disk jacket, is retained on arm 50 by ears 58 and 60.

Motion of arm 50 is controlled in part by a damper assembly which includes three springs 70, 72 and 74, a force adjusting assembly 75, a generally U-shaped bail 76, a stop member 78 and a blade 80. Springs 70, 72 and 74, which are connected to carriage 14, contact a mid-portion of arm 50 to urge the arm toward arm 20. Three springs are preferred to obtain a low spring rate while still providing an adequate biasing force without breaking. In the preferred embodiment the springs exert a force of approximately 15 grams as measured at head 64.

Force adjusting assembly 75 includes a bracket 79 which is affixed to the carriage and an adjusting screw 81 positioned by the bracket to bear against the springs. The assembly permits adjustment of the spring biasing force as necessary to compensate for manufacturing tolerances.

Stop member 78 includes a generally rectangular base portion 82, a bifurcated arm portion 84, a pair of blade-retaining grooves, including a groove 86, and a strain relief portion 88. The base portion is attached to the carriage by two bolts including a bolt 90 visible in this figures. Bracket 79 and spring 70, 72 and 74 are clamped between the screws and the base portion, and flexible member 52 is clamped between the base portion and the carriage. The bifurcated end of arm 84 is disposed within bail 76 and provides a first and second pair of surfaces for limiting the travel of arm 50. Arm 50 is limited in its upward travel when it contacts the top of arm 84 and in its downward travel when the bottom of bail 76 contacts the bottom surface of arm 84. When held in this downward position by springs 70, 72 and 74, flexures 32 and 62 load heads 34 and 64 into compliance with disk 12. (No loading force is contributed by springs 70, 72 and 74.)

Strain relief portion 88 serves to retain bundled wires such as wires 38 which carry signals to and from the read/write heads.

Blade 80, which is generally flat and rectangular in shape, is pivotally disposed in frictional engagement within the slot which bifurcates the arm portion of stop member 78. A pair of rod-shaped portions which project perpendicularly from either side of one end of the blade, including a portion 92, are disposed in the grooves to pivotally retain the blade. The opposite end of the blade, which is disposed within bail 76, has a height substantially equal to the distance between the bottom of the bail and the top of spring 70.

Thus, it will be seen that all but the slightest motion of arm 50 is coupled by the arm or the bail to blade 80 causing a pivoting motion of the blade within arm portion 84 which due to the frictional engagement therebetween, generates a force resisting the motion of the arm. In the preferred embodiment, the frictional engagement is designed to produce a force of approximately 6 grams measured at head 64. This force partially counteracts the force developed by springs 70, 72 and 74 to produce a force margin of approximately 1 to 4 grams measured at the head.

After arm 50 has been pivoted from the loaded position to, say, the unloaded position or to the position which is shown in dashed lines and which is intended for removing or inserting disk 12, and there released, the damper assembly is operative to oppose the spring force reducing the velocity of the head and thereby lessen the force with which the head impacts the disk. Thereafter, the damper is further operative to reduce the oscillatory motion of the arm, to reduce the head-loading time. Laboratory tests indicate that valid head signals are available in a period of time of from 20 to 30 milliseconds following the initiation of a head load command signal.

Although it has been found that a force margin of from 1 to 4 grams is optimal, other combinations of forces and/or force margins may be used. The relationship between the forces can be written in the following form:

$$\frac{F_S - F_B}{R} = F_H + F_M$$

where
$F_S$=Force developed by springs 70, 72 and 74;
$F_B$=Frictional force developed by blade 80 and stop 82;

$$R = \text{Ratio of distances} \frac{\text{Pivot to center of head}}{\text{Pivot to point of application of force}};$$

$F_H$=Head load force; and
$F_M$=Force margin.

An exploded perspective view further illustrating force adjusting assembly 75, stop member 78 and blade 80 is shown in FIG. 2. Bracket 79 of the force adjusting assembly is bent in a generally stepped configuration to provide a mounting surface at one end and to position the other end a suitable distance above the springs. Two apertures are located at distal ends of the bracket, including an aperture 96 for mounting the bracket and a suitably threaded aperture 98 for receiving the force adjusting screw 81.

The stop member may be more clearly seen to include the base portion 82, the bifurcated arm portion 84, the pair of blade-retaining grooves including the groove 86 and a groove 100 and the strain relief portion 88. Generally rectangular base portion 82 is provided for mounting the stop member to carriage 14. The base portion is of sufficient thickness to prevent the springs, flexible member and arm, as seen in FIG. 1, from interfering with one another.

The base portion has two mounting apertures, including apertures 102 and 104, located along the major axis of the base portion at points substantially equidistant from the ends of the base portion and the arm portion.

Arm portion 84 rises perpendicularly from the base portion in a first plane and forward in an orthogonal plane for a first distance. Thereafter, the arm tapers and projects forward to provide proximate its end two pairs of reference surfaces shown at 106 and 108, and 110 and 112 on the bottom and top sides, respectively. One pair of reference surfaces 106 and 108 limit the upward excursions of the arm to a point where a disk can be inserted or removed from the assembly. The other pair of reference surfaces 110 and 112 control the downward excursion of the bail and thus limit the downward excursion of arm 50 to a point where the flexures are operative to load the heads in compliance with the disk. Behind reference surfaces 110 and 112, the arm is relieved as indicated at 114 and 116 to limit the extent of the close tolerance areas.

Skipping for a moment, the generally rectangular strain relief portion 88 projects from a side of the arm portion proximate the base portion to an end. The strain relief portion contains an elongated aperture 118 suitable for receiving the wires conducting signals to and from the read/write heads. A thin slot 120 extends between the aperture and the end, and the corners proximate the slot and the end are rounded to facilitate installation of the wires.

The arm is bifurcated by a slot 122 which extends inward from the end a suitable distance to permit insertion therein of blade 80. In the preferred embodiment the slot has a width of approximately 0.046 of an inch, which is slightly larger than the preferable arm thickness of 0.037 of an inch.

The bottom surface of grooves 86 and 100 each have a semicircular shape of diameter suitable for permitting rotation of the round, rod-shaped portions of blade 80, while preventing lateral movement thereof. The rounded portions of the grooves extend slightly past center to retain the rod-shaped portions after they are snapped therein.

In the preferred embodiment stop member 78 is fashioned from a glass-filled plastic material such as that designated GFN-3 by the G E Corporation, although many other materials are eminently suitable for certain specific design applications of the present invention.

Blade 80 has a generally rectangular shape which is rounded at one end and has the pair of rod-shaped portions including the portion 92 and a portion 130 projecting from the sides thereof from points substantially equidistant from this end, the top and the bottom. The rod-shaped portions have a diameter suitable for confined rotation within the grooves.

At the other end, blade 80 cants from a midportion at an acute angle chosen to align a surface 132 of the blade with surfaces 110 and 112 of the stop member 78 when the blade is suitably disposed within the stop member. The blade terminates in a thickened portion 134 having a rounded lower portion at the bottom 136. This rounded configuration permits the blade to have a height substantially equal to the free space within the bail without binding when the blade pivots. The height of the blade is thus maximized preventing motion of the arm and bail without a corresponding motion of the blade.

The thickened portion 134 of the blade is suitable for spreading the ends of the bifurcated arm portion 84 of stop member 78 producing a friction-generating force therebetween. In the preferred embodiment the thickened portion of the blade has a thickness of substantially 0.070 of an inch measured at the second end. Preferably, each side of the thickened portion is flared at an angle of 1 degree, 30 minutes to match the angle of spread developed by the blade in the ends of the arm portion. Also, to provide long life, a Teflon-filled plastic material such as that designated 404 by the LNP Corporation is employed.

Although in the preferred embodiment, the ends of the plastic arm portion are spread to generate a compressive force for developing the frictional force, numerous variations are possible. For example, a spring clip may be disposed over the stop member to engage the bifurcated portion of the stop member and to generate the compressive force. Alternatively, the end of the stop member may be fashioned from a spring-type metal. Further, a viscous damping force may be developed, as with the use of silicon grease or fluid, as an alternative or addition to the dry or coulomb force developed in the preferred embodiment.

FIG. 3 further illustrates sled 40; however, the figure is also representative of sled 66. Sled 40 has a generally rectangular portion 150 intersecting at distal ends a portion 152 and a portion 154 which project perpendicularly downward therefrom. The rectangular portion is open in the center at 156 to accommodate portions of a read/write head, and it is open at each end at 158 and 160 to accommodate the ears. The opening 158 proximate portion 152 is larger than opening 160 proximate portion 154 in order to accommodate the longer ear 60 as shown in FIG. 1.

Portions 152 and 154 extend down a suitable distance to prevent interference with the associated flexure by a defective disk jacket. Obviously, these portions do not extend down so far as to interfere with normal read/write head and disk compliance.

Although the present invention has been illustrated with reference to the preferred embodiment which, for example, utilizes two read/write heads each affixed to an arm one of which is rigidly mounted and the other pivotally mounted, certain modifications thereof are contemplated. Where data is recorded on or retrieved from only one surface of the disk, one of the heads may be replaced with a pressure pad. Additionally, in certain applications, it may be desirable to pivotally mount and spring load both arms. In such a situation, both arms may be damped utilizing the above-described damper assembly.

Further, although the rigid arm is illustrated as an arm, obviously any suitably disposed portion of the carriage or extension thereof may be used to mount one of the heads or a pressure pad.

It is contemplated that after having read the preceding disclosure other alteration and modifications of the present invention will no doubt become apparent to those skilled in the art. It is therefore intended that the following claims be interpreted to cover all such alterations and modifications as fall within the true spirit and scope of the invention.

What is claimed is:

1. A read/write head carriage assembly for a disk recorder comprising:
 a carriage member;
 an arm pivotally affixed to said carriage member for movement toward and away from a loaded position;
 disk engaging means affixed to said arm;

means for biasing said arm toward said loaded position at which said disk engaging means is loaded in compliance with a suitably disposed disk; and damping means coupled between said carriage member and said arm for damping motion of said arm toward said loaded position:

said damping means including a bifurcated stop member having first and second finger portions disposed in spaced-apart relationship, and a blade which is at least partially disposed between and frictionally engaged with said finger portions so as to spread apart said finger portions, thereby developing an opposing frictional force in response to motion between said stop member and said blade, whereby the motion of said arm toward said loaded position is damped.

* * * * *